US010299429B2

(12) United States Patent
Carl (10) Patent No.: US 10,299,429 B2
(45) Date of Patent: May 28, 2019

(54) ERGONOMIC GRIPPING MECHANISMS OF AN ELECTRIC CUTTING APPARATUS

(71) Applicant: TRANSFORM SR BRANDS LLC, Hoffman Estates, IL (US)

(72) Inventor: Ross Carl, River Forest, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

(21) Appl. No.: 15/486,148

(22) Filed: Apr. 12, 2017

(65) Prior Publication Data

US 2017/0295721 A1    Oct. 19, 2017

Related U.S. Application Data

(60) Provisional application No. 62/322,320, filed on Apr. 14, 2016.

(51) Int. Cl.
*A01D 34/416* (2006.01)
*A01D 34/90* (2006.01)

(52) U.S. Cl.
CPC ..... *A01D 34/4165* (2013.01); *A01D 34/4167* (2013.01); *A01D 34/902* (2013.01)

(58) Field of Classification Search
CPC ............ A01D 34/4165; A01D 34/4167; A01D 34/902
USPC .......................................................... 30/276
See application file for complete search history.

(56) References Cited

U.S. PATENT DOCUMENTS

| 712,843 | A | * | 11/1902 | Paul | |
| 4,179,805 | A | * | 12/1979 | Yamada | B27B 17/0008 172/41 |
| 4,182,562 | A | * | 1/1980 | Iwashita | G03B 17/425 396/265 |
| 4,540,943 | A | * | 9/1985 | Akers | G01V 3/15 16/280 |
| 4,996,773 | A | * | 3/1991 | Albertson | A01G 3/08 30/121 |

(Continued)

OTHER PUBLICATIONS

Kmart.com, Grass Trimmer, Retrieved from Internet [www.kmart.com/craftsman-4-amp-12-in-grass-trimmer/p-07174544000P], Available on Jan. 1, 2000, Retrieved on Jun. 28, 2017, 2 pages.

(Continued)

*Primary Examiner* — Hwei-Siu C Payer
(74) *Attorney, Agent, or Firm* — McAndrews, Held & Malloy, Ltd.

(57) ABSTRACT

Ergonomic gripping mechanisms of battery-operated electric cutting apparatus are provided. The electric cutting apparatus may include a cantilevered cutting head, an adjustable telescoping shaft, a rear grip portion, a pistol grip, and a forearm shaft. The adjustable telescoping shaft may be pivotally connected to the cantilevered cutting head. The rear grip portion may have a first end connected to the adjustable telescoping shaft. The pistol grip may have a first end extending at a first angle from the second end of the rear grip portion. The forearm shaft may extend from the second end of the pistol grip at a second angle. The forearm shaft may have a top side comprising a forearm pad having an exterior surface configured to receive a forearm of a user. The exterior surface of the forearm pad may be parallel to an axis defined by a longitudinal extension of the adjustable telescoping shaft.

19 Claims, 4 Drawing Sheets

(56) References Cited

U.S. PATENT DOCUMENTS

| | | | |
|---|---|---|---|
| 5,265,341 A | 11/1993 | Kikuchi | |
| 5,661,960 A * | 9/1997 | Smith | A01D 34/902 30/276 |
| 5,809,614 A | 9/1998 | Krester, Jr. | |
| 5,867,911 A * | 2/1999 | Yates | A01D 34/90 16/326 |
| 7,134,208 B2 * | 11/2006 | Wilkinson | A01D 34/902 30/276 |
| 7,739,800 B2 * | 6/2010 | Hurley | A01D 34/905 172/14 |
| D675,074 S | 1/2013 | Baxter | |
| 8,667,648 B2 * | 3/2014 | Vierck | A01D 34/416 16/422 |
| D710,161 S | 8/2014 | Carl | |
| 2003/0131448 A1 | 7/2003 | Dickhaus | |
| 2011/0232436 A1 * | 9/2011 | Morabit | A01D 34/902 83/13 |
| 2013/0031787 A1 * | 2/2013 | Kamiya | A01D 34/4163 30/276 |
| 2014/0208598 A1 * | 7/2014 | Morita | A01G 3/053 30/276 |
| 2014/0208599 A1 * | 7/2014 | Nagahama | A01D 34/6806 30/277.4 |
| 2015/0366133 A1 * | 12/2015 | Nojiri | A01D 34/90 30/276 |
| 2016/0143219 A1 * | 5/2016 | Yuan | A01D 34/90 30/276 |
| 2016/0278288 A1 * | 9/2016 | Yamaoka | A01D 34/81 |
| 2017/0295721 A1 * | 10/2017 | Carl | A01D 34/4165 |
| 2018/0368314 A1 * | 12/2018 | Parsons | A01D 34/416 |

OTHER PUBLICATIONS

Sears Craftsman, "Operator's Manual; 12-in. 4.0 Amp. Weedwacker Electric Trimmer," Retrieved from Internet, Feb. 2, 2016, pp. 1-25.

KMart Craftsman, Operator's Manual; 24V MAX* Lithium-Ion Cordless Line Trimmer, Retrieved from Internet, 48 pages.

Sears.com, "Cordless Line Trimmer," Retrieved from Internet [www.sears.com/craftsman-24v-max-li-ion12inch-cordless-line/p-07174580000P], Available on Feb. 2, 2016, Retrieved on Jun. 28, 2017, 8 pages.

PCT International Search Report and Written Opinion for International Application No. PCT/US17/27585, filed Apr. 14, 2017, dated Jul. 19, 2017, 14 pages.

PCT International Search Report and Written Opinion for International Application No. PCT/US17/27585, filed Apr. 14, 2017, dated Aug. 2, 2017, 14 pages.

* cited by examiner

ERGONOMIC GRIPPING MECHANISMS OF AN ELECTRIC CUTTING APPARATUS

CROSS-REFERENCE TO RELATED APPLICATIONS/INCORPORATION BY REFERENCE

The present application claims priority under 35 U.S.C. § 119(e) to provisional application Ser. No. 62/322,320, filed on Apr. 14, 2016. The above referenced provisional application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD

Certain embodiments relate to battery-operated electric cutting apparatuses. More specifically, certain embodiments provide ergonomic gripping mechanisms of battery-operated electric cutting apparatuses having cantilevered cutting heads, such as line trimmers and pole saws. The ergonomic gripping mechanisms provide a more natural grip position and improved weight distribution for tools incorporating cantilevered cutting heads.

BACKGROUND

Battery-operated electric cutting apparatuses having cantilevered cutting heads typically include: (1) a motor and cutting mechanism in a cutting head at a first end, and (2) a flat handle and battery at a second end. The weight of the cutting head having the motor and cutting mechanism usually substantially outweighs the flat handle and battery end, resulting in an unbalanced cutting apparatus that may be difficult, uncomfortable, and/or unnatural to hold by a user. Moreover, existing battery-operated electric cutting apparatuses having cantilevered cutting heads typically have limited, if any, adjustable features to provide a natural grip orientation.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

Ergonomic gripping mechanisms of battery-operated electric cutting apparatuses having cantilevered cutting heads are provided, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Certain embodiments may be found in ergonomic gripping mechanisms 114, 120, 130, 146, 150 of battery-operated electric cutting apparatuses 100 having cantilevered cutting heads 110. More specifically, certain embodiments provide ergonomic gripping mechanisms 114, 120, 130, 146, 150 that provide a more natural grip position and improved weight distribution for tools 100 incorporating cantilevered cutting heads 110.

As used herein, an element recited in the singular and proceeded with the word "a" or "an" should be understood as not excluding the plural of the elements, unless such exclusion is explicitly stated. Furthermore, references to "an embodiment," "one embodiment," "a representative embodiment," "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Although certain embodiments in the foregoing description may be shown with a line trimmer apparatus, for example, unless so claimed, the scope of various aspects of the present disclosure should not be limited to line trimmers and may additionally and/or alternatively be applicable to any suitable battery-operated electric cutting apparatus having a cantilevered cutting head, such as pole saw and the like.

Figure 1:
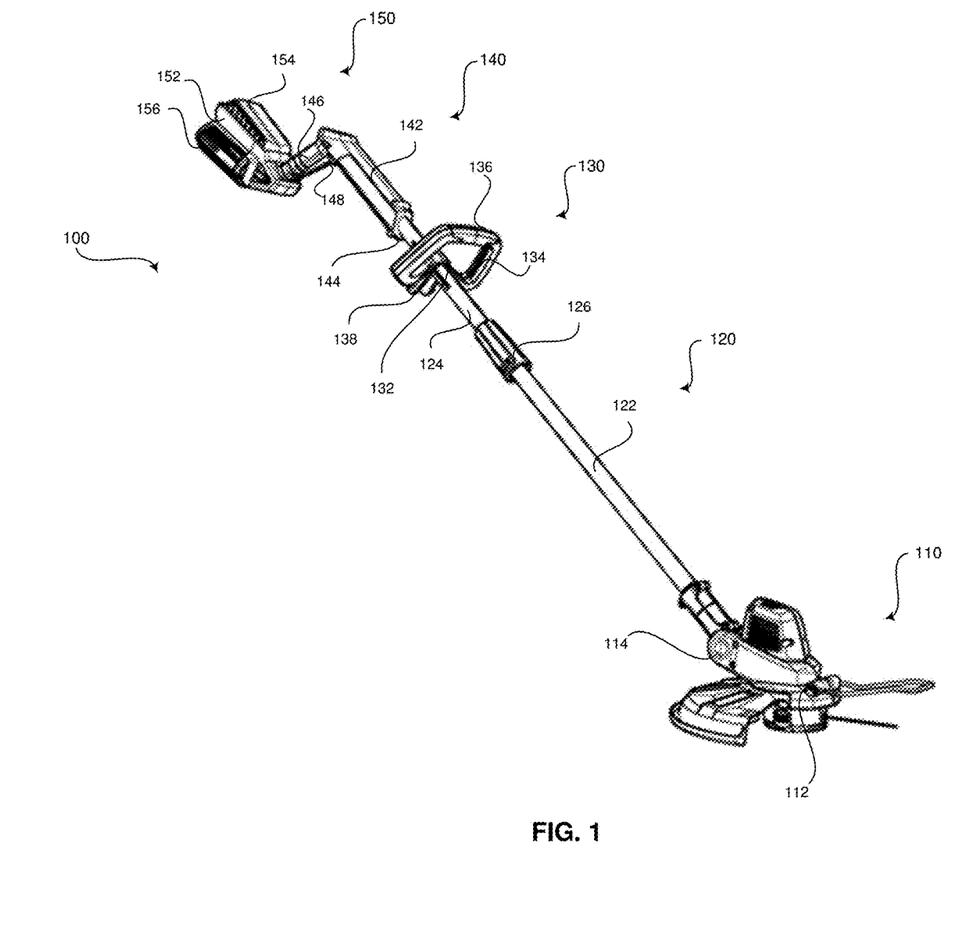
FIG. 1 is a front side perspective view of an exemplary battery-operated electric cutting apparatus having a cantilevered cutting head and ergonomic gripping mechanisms, in accordance with various embodiments.
Figure 2:
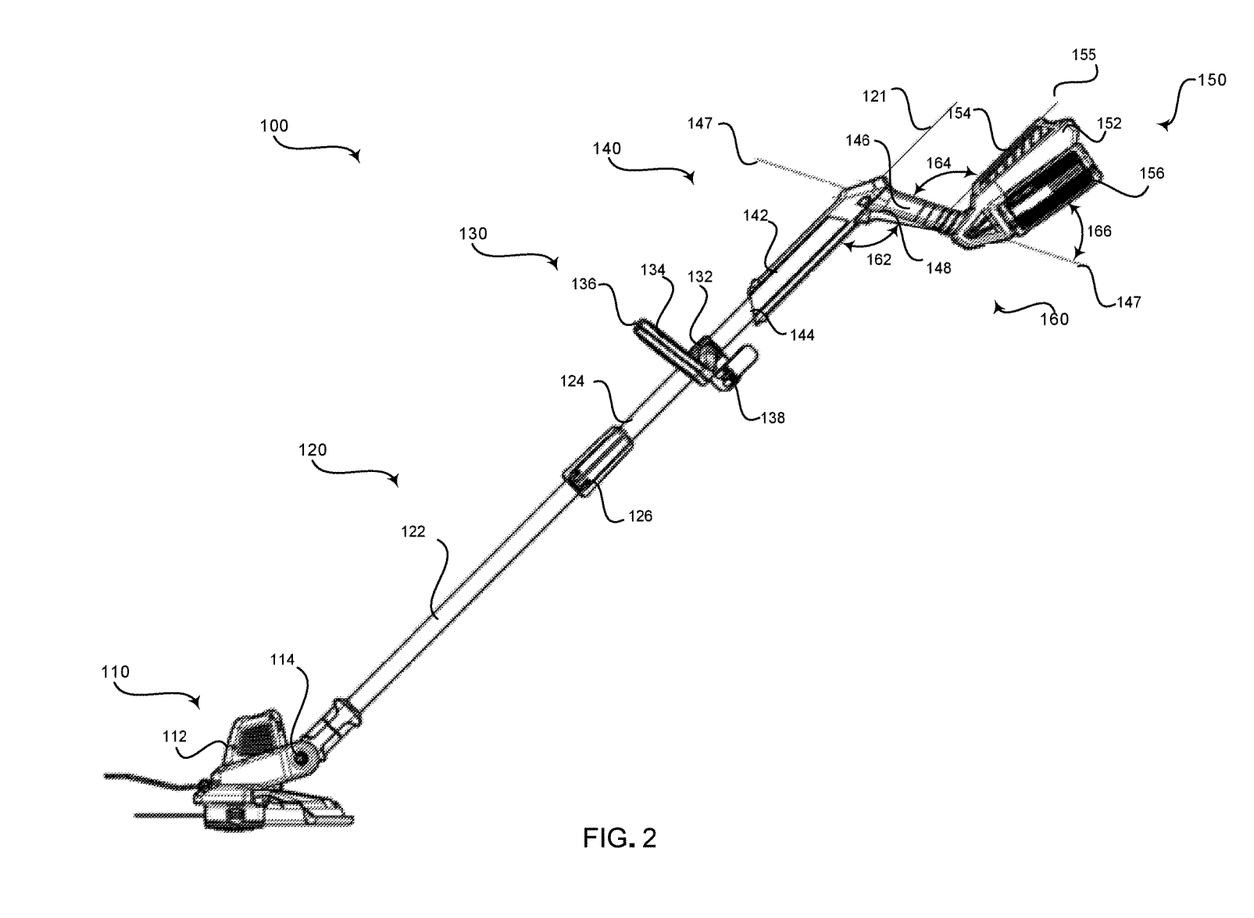
FIG. 2 is a side view of an exemplary battery-operated electric cutting apparatus having a cantilevered cutting head and ergonomic gripping mechanisms, in accordance with various embodiments.
Figure 3:
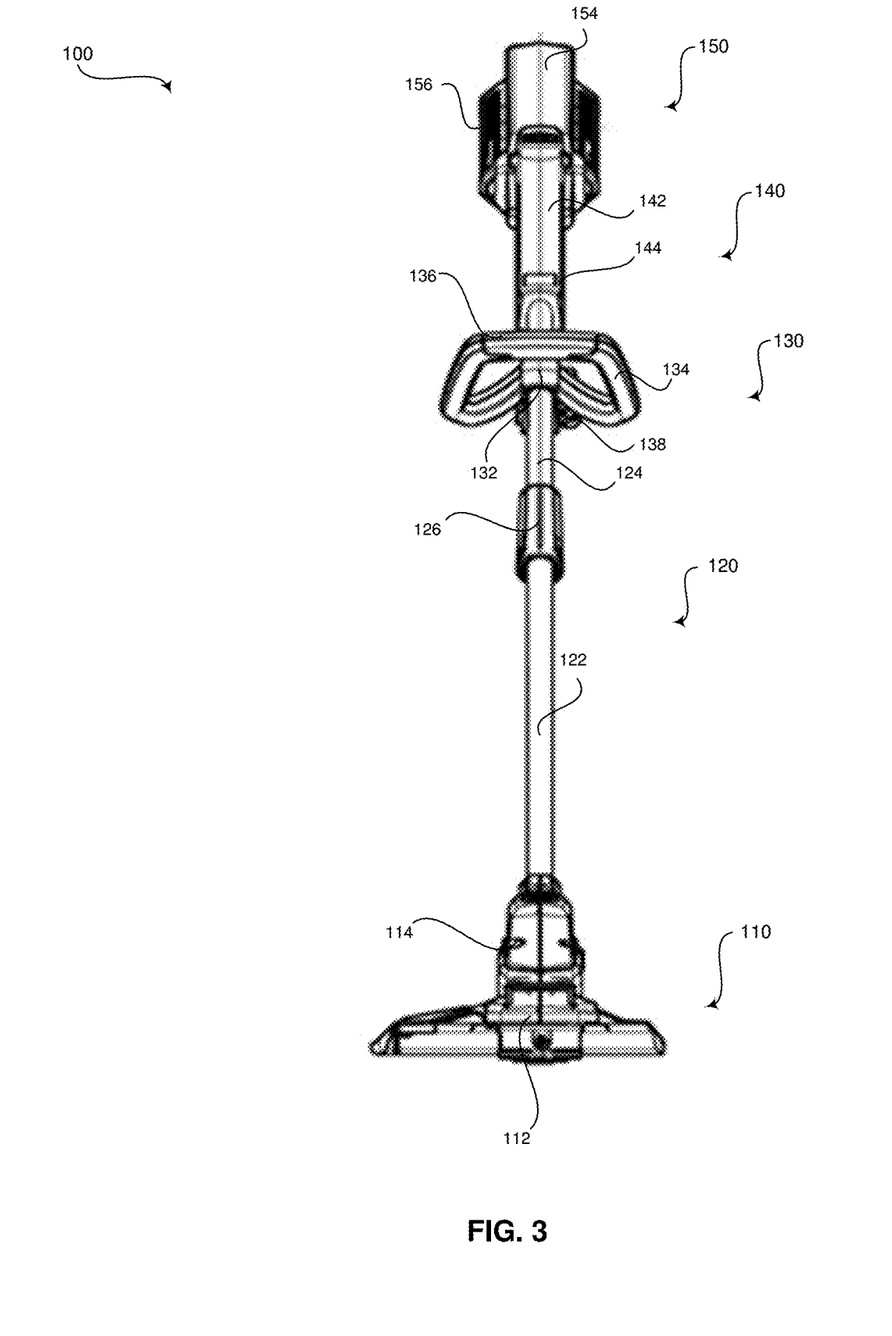
FIG. 3 is a front view of an exemplary battery-operated electric cutting apparatus having a cantilevered cutting head and ergonomic gripping mechanisms, in accordance with various embodiments.

FIG. 1 is a front side perspective view of an exemplary battery-operated electric cutting apparatus 100 having a cantilevered cutting head 110 and ergonomic gripping mechanisms 114, 120, 130, 146, 150, in accordance with various embodiments. FIG. 2 is a side view of an exemplary battery-operated electric cutting apparatus 100 having a cantilevered cutting head 110 and ergonomic gripping mechanisms 114, 120, 130, 146, 150, in accordance with various embodiments. FIG. 3 is a front view of an exemplary battery-operated electric cutting apparatus 100 having a cantilevered cutting head 110 and ergonomic gripping mechanisms 114, 120, 130, 146, 150, in accordance with various embodiments. Referring to FIGS. 1-3, the battery operated electric cutting apparatus 100 comprises a cutting head 110, a telescoping shaft 120, a forward grip 130, a rear grip portion 140, and a forearm fulcrum portion 150.

Figure 4:
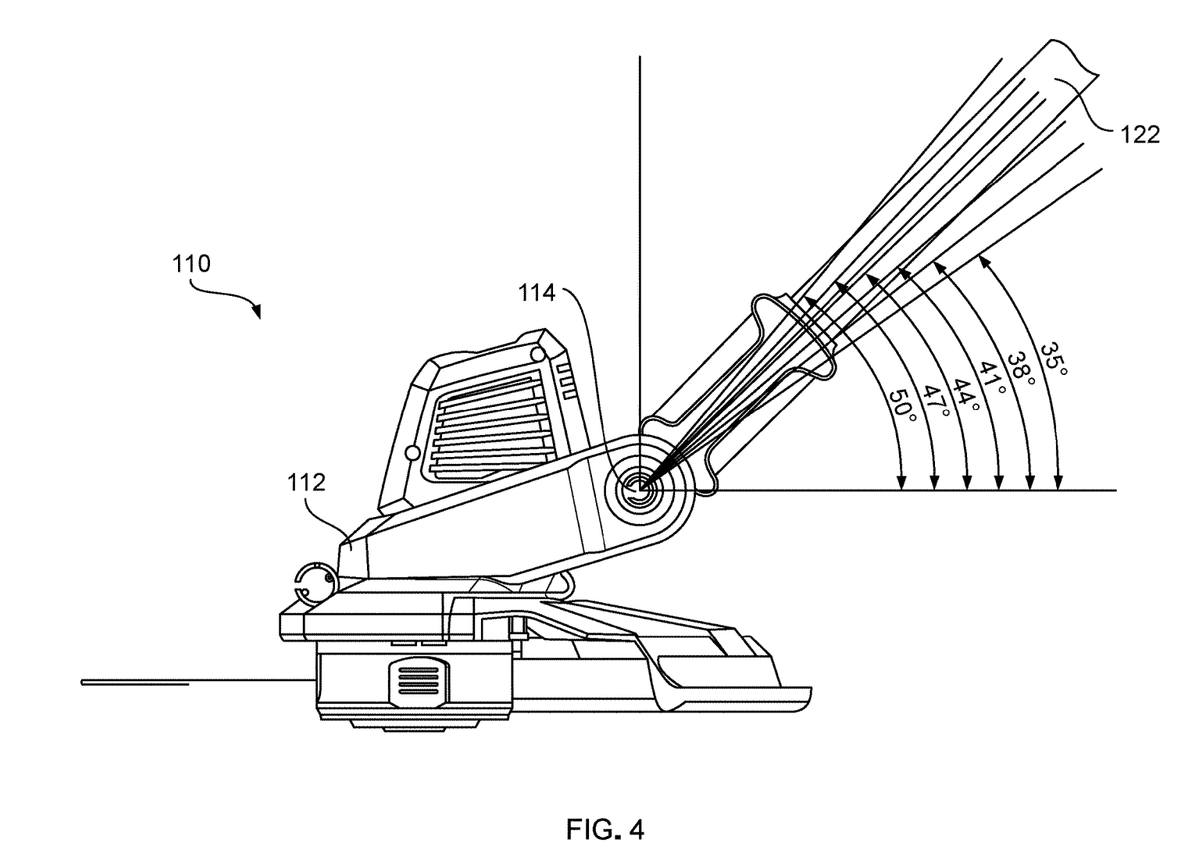
FIG. 4 is a side view of an exemplary cantilevered cutting head, in accordance with various embodiments.

The cutting head 110 may include a base portion 112 and a cutting head pivot 114. The base portion 112 may include a motor, a cutting mechanism (e.g., line or blade), a protective cover, and the like. FIG. 4 is a side perspective view of an exemplary cantilevered cutting head 110, in accordance with various embodiments. Referring to FIGS. 1-4, the cantilevered cutting head 110 comprises a base portion 112 pivotally coupled to a lower shaft portion 122 of the telescoping shaft 120 by the cutting head pivot 114. The cutting head pivot 114 may be a spring loaded mechanism or any suitable mechanism for: (1) releasing the base portion 112 from a locked position to allow the base portion 112 to pivot one or more of frontward, backward, left, right, and/or angled sideways, and (2) locking the base portion 112 in the locked position after selection of a desired orientation. For example, the pivot 114 may have one or more buttons that are depressed to allow the base portion 112 to rotate and/or pivot. In various embodiments, the cutting head pivot 114 may include detents to provide pre-defined positions. The one or more buttons, once released, may lock the base portion 112 in the orientation at the time of the button release. As an example, the buttons may include or be directly or indirectly coupled with protrusions that may extend into detents corresponding with pre-defined cutting head positions.

Referring to FIG. 4, the base portion 112 may be pivotable over a defined range, such as 35 to 50 degrees, 25 to 60 degrees, or any suitable range. The cutting head pivot 114 may include detents at pre-defined positions within the defined range. In various embodiments, the detents may be evenly spaced. For example, the cutting head pivot 114 may include 6 detents spaced every 3 degrees in the defined range from 35 to 50 degrees, as illustrated in FIG. 4. As another example, the cutting head pivot 114 may include 8 detents over a defined range from 25 to 60 degrees.

Referring again to FIGS. 1-3, the telescoping shaft 120 may include a lower shaft portion 122, an upper shaft portion 124, and a shaft release 126. The lower shaft portion 122 may be arranged to move rectilinearly relative to the upper shaft portion 124 along an axis 121 defined by a longitudinal extension of the upper shaft portion 124. The lower shaft portion 122, for example, may be arranged to move between an extended position and a retracted position. The lower shaft portion 122 may have a diameter that is less than the diameter of the upper shaft portion 124 such that the lower shaft portion 122 may slide into and extend out from the upper shaft portion 124, for example. The lower shaft portion 122 and upper shaft portion 124 may be aluminum, hard plastic, or any suitable material. The lower shaft portion 122 may be secured in a fixed position relative the upper shaft portion 124 by the shaft release 126. The shaft release 126 may be a spring loaded mechanism or any suitable mechanism for: (1) releasing the lower portion 122 to allow the lower portion 122 to slide into and/or out of the upper shaft portion 124, and (2) locking the lower shaft portion 122 in a locked position after selection of a telescoping shaft 120 length.

The forward grip 130 may comprise a base 132, a handle 134, a grip 136, and a forward grip release 138. The base 132 may be slidably coupled to the upper shaft portion 124 of the telescoping shaft 120. For example, the base 132 may be slidable up/down and/or around upper shaft portion 124. The handle 134 may be pivotally coupled to the base 132. For example, the handle 134 may be pivotable in one or more of up/down, left/right, and sideway angled directions. The grip 136 may be an elastomer or any suitable material arranged on one or more surfaces of the handle 134 to provide a comfortable, non-slip surface for grasping by a user.

The forward grip release 138 may be one or more mechanisms for securing and releasing the base 132 to the upper shaft portion 124 and/or the handle 134 to the base 132. The forward grip release 138 illustrated in FIGS. 1-3 is a spring loaded cam-lock mechanism 138. Additionally and/or alternatively, the forward grip release 138 may be any suitable mechanism for (1) releasing the base 132 to allow the base 132 to slide up, down, and/or around the upper shaft portion 124, (2) locking the base 132 in a locked position after selection of a base 132 position and/or orientation, (3) releasing the handle 134 to allow the handle 134 to pivot up/down, left/right, and/or sideway angled directions with respect to the base 132, and/or (4) locking the handle 134 in a locked position after selection of a handle 134 position and/or orientation. For example, the forward grip release 138 may have one or more buttons that are depressed to allow the base 132 and/or handle 134 to slide, rotate, and/or pivot. In various embodiments, the forward grip release 138 may include detents to provide pre-defined positions. The one or more buttons, once released, may lock the base 132 and/or handle 134 in the orientation at the time of the button release. As an example, the buttons may include or be directly or indirectly coupled with protrusions that may extend into detents corresponding with pre-defined forward grip 130 position and/or orientation.

The rear grip portion 140 may comprise an upper rear grip portion 142, a shaft coupling 144, a pistol grip 146, and a trigger 148. The upper rear grip portion 142 may have a first end that includes the shaft coupling 144 and a second end from which the pistol grip 146 extends. The shaft coupling 144 may be a socket or any suitable mechanism for fixably receiving the upper shaft portion 124. Additionally and/or alternatively, the upper shaft portion may be integrated with the upper rear grip portion 142. The upper rear grip portion 142 may be a hard plastic or any suitable material. The pistol grip 146 may extend downward at an angle from the upper rear grip portion 142. For example, as illustrated in FIG. 2, the angle 162 may be approximately 117 degrees; however, it is contemplated that the angle 162 may be more or less (e.g., between 115 and 125 degrees; between 110 and 135 degrees; between 105 degrees and 145 degrees and/or, between 100 and 155 degrees, among other suitable ranges less than 180 degrees and greater than or equal to 90 degrees). The pistol grip 146 may include an elastomer or any suitable material to provide a comfortable, non-slip surface for grasping by a user. In various embodiments, the pistol grip 146 is configured to be grasped by one hand of the user and the forward grip 130 is configured to be grasped by another hand of the user. The trigger 148 may extend from one or more of the upper rear grip portion 142 or the pistol grip 146.

The trigger 148 is configured to start a cutting action by the cutting mechanism of the cutting head with the trigger 148 is depressed and to stop the cutting action when the trigger 148 is released. The trigger 148, for example, may be coupled by electrical wires to the cutting head 110 and a battery 156. The electrical wires may run through a hollow portion of the pistol grip 146, the upper rear grip portion 142, the upper shaft portion 124, and the lower shaft portion 122. In various embodiments, the hollow portion of the pistol grip 146, the upper rear grip portion 142, the upper shaft portion 124, and/or the lower shaft portion 122 may include sheathing to protect the wiring. For example, the upper shaft portion 124 may include sheathing to protect the wires from damage when the lower shaft portion 122 is retracted.

The forearm fulcrum portion 150 may comprise a forearm shaft 152, a forearm pad 154, and a battery 156. The forearm shaft 152 may comprise a first side and a second side. The first side of the forearm shaft 152 may include a forearm pad 154 such as an elastomer, foam, or any suitable padding material. The second side of the forearm shaft 152 may include electrical connections and an attachment mechanism for receiving a battery 156. For example, the attachment mechanism may be grooves configured to slidably receive ridges in a battery 156, or any suitable attachment mechanism. In various embodiments, the apparatus 100 may be configured with an enclosure-free battery 156. For example, the battery 156 may snap, slide, or otherwise directly and securely connect with the electrical connections on the forearm shaft 152 without including a housing or other enclosure for the battery 156. In an exemplary embodiment, the forearm shaft 152 and/or the battery 156 may comprise a release for releasing the battery 156 from its secure connection to the electrical connections on the forearm shaft 152. The release may be a button, tab, or any suitable mechanism for engaging and disengaging the battery 156 with the forearm shaft 152.

The forearm shaft 152 may be coupled to and/or integrated with the pistol grip 146 and extend back at an angle from the pistol grip 146. For example, as illustrated in FIG. 2, the angle 164 may be approximately 117 degrees; however, it is contemplated that the angle 164 may be more or less (e.g., between 115 and 125 degrees; between 110 and 135 degrees; between 105 and 145 degrees; and/or, between 100 and 155 degrees, among other suitable ranges less than 180 degrees and greater than or equal to 90 degrees). The angle 166 on the battery 156 side of the forearm shaft 152 is dependent upon the angle 164 on the forearm pad 154 side of the forearm shaft 152.

The forearm pad 154 may include an exterior surface for receiving a forearm of a user. The exterior surface of the forearm pad 154 may be parallel with an axis 121 defined by a longitudinal extension of the telescoping shaft 120. The distance between the longitudinal axis 121 extending from the shaft 120 and the exterior surface of the forearm pad 154 may be approximately 4.26 inches, which is defined as 3.75 to 5.5 inches. The distance from a center 147 of the pistol grip 146 to the distal end of the forearm pad 154 may be approximately 8.5 inches, which is defined as 7 to 11 inches. The parallel alignment of the forearm pad 154 with respect to the longitudinal shaft axis 121, the distance of approximately 4.26 inches between the forearm pad 154 and the longitudinal shaft axis 121, and/or the distance of approximately 8.5 inches between the center 147 of the pistol grip 146 and the distal end of the forearm pad 154 may improve weight distribution and provide a natural grip position of the electric cutting apparatus 100.

In various embodiments, the battery-operated electric cutting apparatus 100 having a cantilevered cutting head 110 and ergonomic gripping mechanisms 114, 120, 130, 146, 150 provides a natural grip orientation that affords anthropometric advantage over existing trimmer and pole saw grips by providing a more natural grip position and improved weight distribution. For example, the adjustable telescoping shaft 120 length may improve the ergonomics of the battery-operated electric cutting apparatus 100 by allowing the length of the apparatus 100 to be customizable to a particular user and/or for different uses. As an example, with respect to cutting operations at ground level, the apparatus 100 may be more easily gripped by shorter users when the selected length of the telescoping shaft 120 is a shorter length so that the cutting head 110 need not be held far out in front of the user. Additionally and/or alternatively, with respect to cutting operations at ground level, the apparatus 100 may be more easily gripped by taller users when the selected length of the telescoping shaft 120 is a longer length so that the user does not need to bend forward at the waist to position the cutting head 110 at ground level. The adjustability of the cutting head 110 provides improved grip positioning as well.

As another example, positioning the battery 156 back on a forearm shaft 152 assists with weight distribution over typical apparatuses 100 having the battery adjacent the rear grip. Moreover, the forearm shaft 152 having the forearm pad 154 provides a fulcrum that affords greater leverage to a user gripping the apparatus 100 with a forearm positioned on the forearm pad 154. The pistol grip 146 provides a more natural gripping position compared with flat handles of typical trimmers and pole saws. Furthermore, the adjustability of the forward grip 130 provides improved gripping positions as well.

Aspects of the present disclosure provide a battery-operated electric cutting apparatus 100. The apparatus 100 may comprise a cantilevered cutting head 110. The apparatus 100 may comprise an adjustable telescoping shaft 120 pivotally connected to the cantilevered cutting head 110. The apparatus 100 may comprise a rear grip portion 140 having a first end and a second end. The first end of the rear grip portion 140 may be connected to the adjustable telescoping shaft 120. The apparatus 100 may comprise a pistol grip 146 having a first end and a second end. The first end of the pistol grip 146 may extend at a first angle 162 from the second end of the rear grip portion 142. The apparatus 100 may comprise a forearm shaft 152 that may extend from the second end of the pistol grip 146 at a second angle 164. The forearm shaft 152 may have a top side and an underside. The top side may comprise a forearm pad 154 having an exterior surface configured to receive a forearm of a user. The exterior surface of the forearm pad 154 may be parallel to an axis 121 defined by a longitudinal extension of the adjustable telescoping shaft 120.

In various embodiments, the apparatus 100 may comprise a forward grip 130 slidably attached to the adjustable telescoping shaft 120. The forward grip 130 may comprise a base 132 slidably coupled to the adjustable telescoping shaft 120. The forward grip 130 may comprise a handle 134 pivotally coupled to the base 132. The forward grip 130 may comprise a grip 136 arranged on one or more surfaces of the handle 134. The forward grip 130 may comprise a forward grip release 138 configured to one or both of secure and release one or both of the base 132 to the adjustable telescoping shaft 120 and the handle 134 to the base 132. In certain embodiments, the forward grip release 138 may be a spring loaded cam-lock mechanism 138.

In a representative embodiment, the underside of the forearm shaft 152 may comprise a battery attachment mechanism. In various embodiments, the apparatus 100 may comprise a battery 156 attached to the battery attachment mechanism at the underside of the forearm shaft 152. In certain embodiments, the battery attachment mechanism may comprise grooves and the battery 156 comprises ridges. The battery attachment mechanism may be configured to slidably receive the ridges of the battery 156. In a representative embodiment, the underside of the forearm shaft 152 may comprise electrical connections. The battery may be configured to directly connect to the electrical connections. One or both of the battery 156 and the forearm shaft 152 may comprise a release configured to release the battery 156 from the electrical connections. In certain embodiments, the underside of the forearm shaft 152 may comprise electrical connections. In various embodiments, the apparatus 100 may comprise an enclosure-free battery 156 configured to directly connect to the electrical connections.

In certain embodiments, a distance between the exterior surface of the forearm pad 154 and the axis 121 defined by the longitudinal extension of the adjustable telescoping shaft 120 may be approximately 4.26 inches. In a representative embodiment, a distance from a center 147 of the pistol grip 146 to a distal end of the forearm pad 154 may be approximately 8.5 inches. In various embodiments, the first angle 162 may be equal to the second angle 164. In certain embodiments, one or both of the first angle 162 and the second angle 164 may be between 115 and 125 degrees. In a representative embodiment, one or both of the first angle 162 and the second angle 164 may be between 110 and 135 degrees.

In various embodiments, the cantilevered cutting head 110 may comprise a base portion 112 pivotally coupled to the adjustable telescoping shaft 120 at a cutting head pivot 114. The cutting head pivot 114 may comprise detents to provide a plurality of pre-defined positions within a pre-defined range. In a representative embodiment, one or both of the pre-defined range may be 35 to 50 degrees and the cutting head pivot 114 may comprise at least 6 detents. Each of the detents may correspond with a pre-defined position within the pre-defined range. In certain embodiments, one or both of the pre-defined range may be 25 to 60 degrees and the cutting head pivot 114 may comprise at least 8 detents. Each of the detents may correspond with a pre-defined position within the pre-defined range.

In a representative embodiment, the adjustable telescoping shaft 120 may comprises a lower shaft portion 122 connected to the cantilevered cutting head 110 and an upper shaft portion 124 one or both of coupled to or integrated with the rear grip portion 140. The lower shaft portion 122 may be arranged to move rectilinearly relative to the upper shaft portion 124 along the axis 121 defined by the longitudinal extension of the adjustable telescoping shaft 120. In various embodiments, the lower shaft portion 122 may have a first diameter that is less than a second diameter of the upper shaft portion 124 such that the lower shaft portion 122 may be slidable one or both of into and out of the upper shaft portion 124. The adjustable telescoping shaft 120 may comprise a shaft release 126 configured to one or both of release the lower shaft portion 122 to a slidable position and lock the lower shaft portion 122 in a fixed position.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As used herein, the terms "exemplary" and "example" mean serving as a non-limiting example, instance, or illustration. As used herein, the term "e.g." and "for example" set off lists of one or more non-limiting examples, instances, or illustrations. As utilized herein, a component is "operable" and/or "configured" to perform a function whenever the component is designed and comprises the necessary element(s) to perform the function, regardless of whether the function is performed and/or whether performance of the function is disabled, or not enabled, by some user-configurable setting.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment or embodiments disclosed, but that the present disclosure will include all embodiments falling within the scope of the appended claims.

What is claimed is:

1. An electric cutting apparatus comprising:
   a cantilevered cutting head;
   an adjustable telescoping shaft pivotally connected to the cantilevered cutting head;
   a rear grip portion having a first end and a second end, the first end connected to the adjustable telescoping shaft;
   a pistol grip having a first end and a second end, the first end of the pistol grip extending at a first angle from the second end of the rear grip portion; and
   a forearm shaft extending from the second end of the pistol grip at a second angle, the forearm shaft having a top side and an underside, the top side comprising a forearm pad having an exterior surface configured to receive a forearm of a user,
   wherein the exterior surface of the forearm pad is parallel to an axis defined by a longitudinal extension of the adjustable telescoping shaft, and
   wherein the pistol grip is positioned between an axis defined by a longitudinal extension of the forearm shaft and the longitudinal extension of the adjustable telescoping shaft.

2. The electric cutting apparatus of claim 1, comprising a forward grip slidably attached to the adjustable telescoping shaft.

3. The electric cutting apparatus of claim 2, wherein the forward grip comprises:
   a base slidably coupled to the adjustable telescoping shaft,
   a handle pivotally coupled to the base,
   a grip arranged on one or more surfaces of the handle, and
   a forward grip release configured to one or both of secure and release one or both of the base to the adjustable telescoping shaft and the handle to the base.

4. The electric cutting apparatus of claim 3, wherein the forward grip release is a spring loaded cam-lock mechanism.

5. The electric cutting apparatus of claim 1, wherein a battery is attached at the underside of the forearm shaft.

6. The electric cutting apparatus of claim 1, wherein a battery is slidably coupled at the underside of the forearm shaft.

7. The electric cutting apparatus of claim 1, wherein a battery is electrically connected directly to the underside of the forearm shaft, the battery being releasable from the underside of the forearm shaft.

8. The electric cutting apparatus of claim 1, wherein a battery is electrically connected to the underside of the forearm shaft.

9. The electric cutting apparatus of claim 1, comprising an enclosure-free battery configured to electrically connect directly to the underside of the forearm shaft.

10. The electric cutting apparatus of claim 1, wherein a distance between the exterior surface of the forearm pad and the axis defined by the longitudinal extension of the adjustable telescoping shaft is approximately 4.26 inches.

11. The electric cutting apparatus of claim 1, wherein a distance from a center of the pistol grip to a distal end of the forearm pad is approximately 8.5 inches.

12. The electric cutting apparatus of claim 1, wherein the first angle is equal to the second angle.

13. The electric cutting apparatus of claim 1, wherein one or both of the first angle and the second angle is between 115 and 125 degrees.

14. The electric cutting apparatus of claim 1, wherein one or both of the first angle and the second angle is between 110 and 135 degrees.

15. The electric cutting apparatus of claim 1, wherein the cantilevered cutting head comprises a base portion pivotally coupled to the adjustable telescoping shaft at a cutting head pivot, and wherein the cutting head pivot provides a plurality of pre-defined positions within a pre-defined range.

16. The electric cutting apparatus of claim 15, wherein one or both of:
the pre-defined range is 35 to 50 degrees, and
the cutting head pivot provides at least 6 pre-defined positions within the pre-defined range.

17. The electric cutting apparatus of claim 15, wherein one or both of:
the pre-defined range is 25 to 60 degrees, and
the cutting head pivot provides at least 8 pre-defined positions within the pre-defined range.

18. The electric cutting apparatus of claim 1, wherein the adjustable telescoping shaft comprises a lower shaft portion connected to the cantilevered cutting head and an upper shaft portion one or both of coupled to or integrated with the rear grip portion, and wherein the lower shaft portion is arranged to move rectilinearly relative to the upper shaft portion along the axis defined by the longitudinal extension of the adjustable telescoping shaft.

19. The electric cutting apparatus of claim 18, wherein the lower shaft portion has a first diameter that is less than a second diameter of the upper shaft portion such that the lower shaft portion is slidable one or both of into and out of the upper shaft portion, and wherein the adjustable telescoping shaft comprises a shaft release configured to one or both of release the lower shaft portion to a slidable position and lock the lower shaft portion in a fixed position.

* * * * *